(12) United States Patent
Nakayama (10) Patent No.: US 6,339,205 B1
(45) Date of Patent: Jan. 15, 2002

(54) GRID SUPPORT WELDING APPARATUS

(75) Inventor: Kimio Nakayama, Naka-gun (JP)

(73) Assignee: Mitsubishi Nuclear Fuel Co., Ltd., Naka-gun (JP)

( * ) Notice: Subject to any disclaimer, the term of this patent is extended or adjusted under 35 U.S.C. 154(b) by 0 days.

(21) Appl. No.: 09/476,084

(22) Filed: Jan. 3, 2000

(30) Foreign Application Priority Data

Jan. 27, 1999 (JP) .......................................... 11-019136

(51) Int. Cl.[7] .............................................. B23K 10/00
(52) U.S. Cl. ............................ 219/121.36; 219/121.58; 219/121.39; 219/121.48
(58) Field of Search ...................... 219/121.63, 121.64, 219/121.85, 121.84, 121.36, 121.58, 121.48; 376/261, 260

(56) References Cited

U.S. PATENT DOCUMENTS

| | | | | |
|---|---|---|---|---|
| 4,873,413 A | * | 10/1989 | Uesugi et al. | 219/121.68 |
| 5,221,515 A | * | 6/1993 | Theibaut et al. | 219/121.78 |
| 5,322,988 A | * | 6/1994 | Russell et al. | 219/121.69 |
| 5,611,883 A | * | 3/1997 | Tompkins et al. | 219/121.36 |
| 5,958,267 A | * | 9/1999 | Lingenfelter et al. | 219/121.63 |

* cited by examiner

Primary Examiner—Mark Paschall
(74) Attorney, Agent, or Firm—Oblon, Spivak, McClelland, Maier & Neustadt, PC (57) ABSTRACT

Welding operations on a grid support 1 housed in a welding chamber 23 is carried out using a laser welding apparatus placed outside the welding chamber. In the interior space of the chamber, a pair of supply nozzles 44 are disposed on each of the mutually orthogonal edge sections of two top and bottom glass surfaces 27a, 27b of the roughly cubic chamber 23. An inert gas is ejected in a planar stream from the blast slot openings 45 provided on each supply nozzle 44 along the top and bottom glass surfaces and side glass surfaces. The glass surfaces 27a, 27b that face many welding sections of the grid support are shielded by the sweeping action in two directions, and the glass surfaces 27c that oppose lesser number of welding sections are shielded by the sweeping action in one direction with the inert gas. Fumes and plasmas produced from welding sections are thus swept away before they can reach the glass surfaces, and are discharged with the spent inert gas.

11 Claims, 8 Drawing Sheets

GRID SUPPORT WELDING APPARATUS

BACKGROUND OF THE INVENTION

1. Field of the Invention

The present invention relates to an apparatus for welding joint sections of straps and others of a grid support, which constitute a part of a nuclear fuel assembly for an atomic reactor.

2. Description of the Related Art

Conventionally, a nuclear fuel assembly used in light water atomic reactors, for example, is comprised by a plurality of grid supports disposed between an upper nozzle and a lower nozzle that are separated at a given distance, and includes an instrument pipe and a plurality of control rod guide pipe fixed to each grid support, upper nozzle and lower nozzle, and fuel rods inserted in the grid spaces of each grid support. Each grid support is constructed by cross joining the straps made of thin strips in a lattice form.

Figure 10:
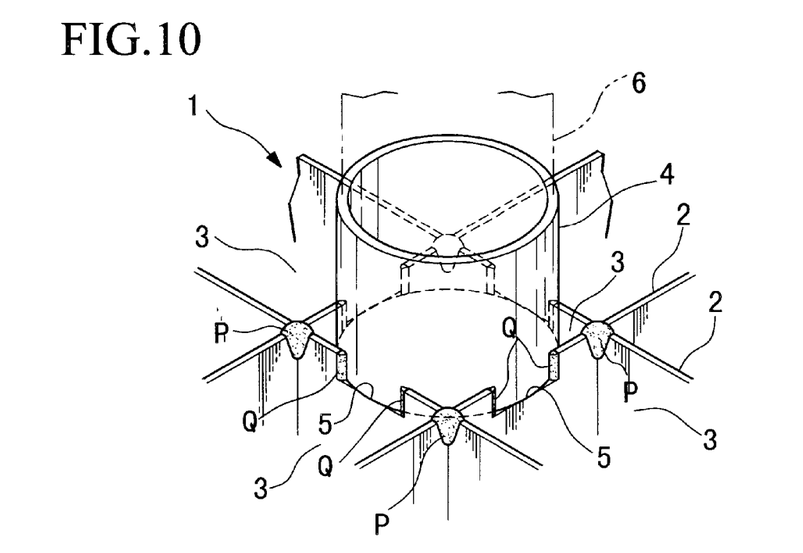
FIG. 10 is a perspective view of the essential parts of the joint section and the abutting section to be welded on the upper surface of the grid support.

For example, in the grid support 1 shown in FIG. 10, individual inner straps 2 are assembled to form a lattice structure containing a plurality of grid spaces 3, and the joint sections (weld sections) P formed by crossed straps 2 are spot welded using a laser welding apparatus and the like. Further, a sleeve 4 is inserted in a portion of the grid space 3, and the abutting sections Q formed at the cutout section 5 formed at the top and bottom ends of the inner strap 2 are seam welded in a continuous line by using a laser welder. A control rod guide pipe 6 is inserted in each sleeve 4, and the two are locked as a unit by expanding the tubes.

Figure 11:
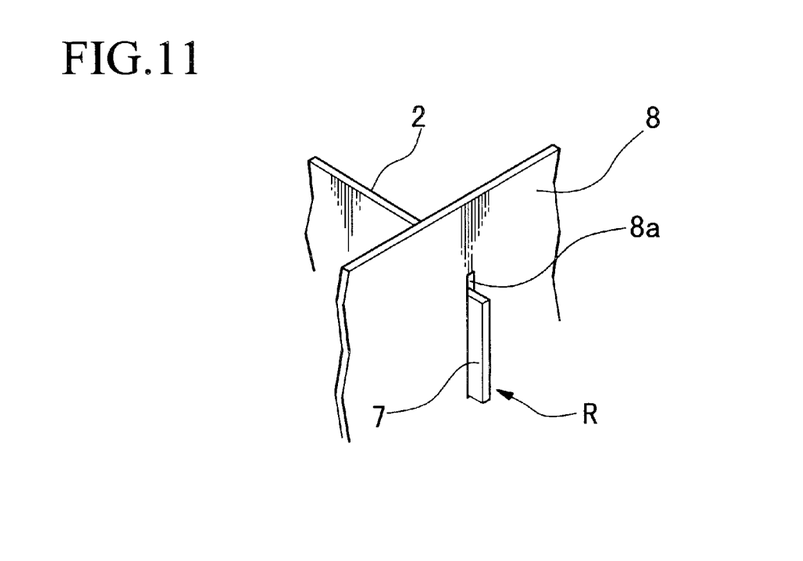
FIG. 11 is a perspective view of the essential parts of the coupling section to be welded by joining the outer straps.

Also, at the intersection points of the inner straps 2 and the outer straps 8 shown in FIG. 11, weld tabs 7 formed on both ends of each inner strap 2 are coupled to respective grooves 8a of the outer straps 8, which are disposed on the four corners of the grid support 1, to form a coupling section R (welding section), which is also welded.

The grid support 1 thus assembled has an upper surface 1a and a lower surface 1b of a square shape, having many sections to be welded, such as a plurality of joint sections P and abutting sections Q, and rectangular shaped side surfaces 1c having the coupling sections R. Therefore, there is a need to carry out a large number of welding operations in making a fuel assembly.

Figure 12:
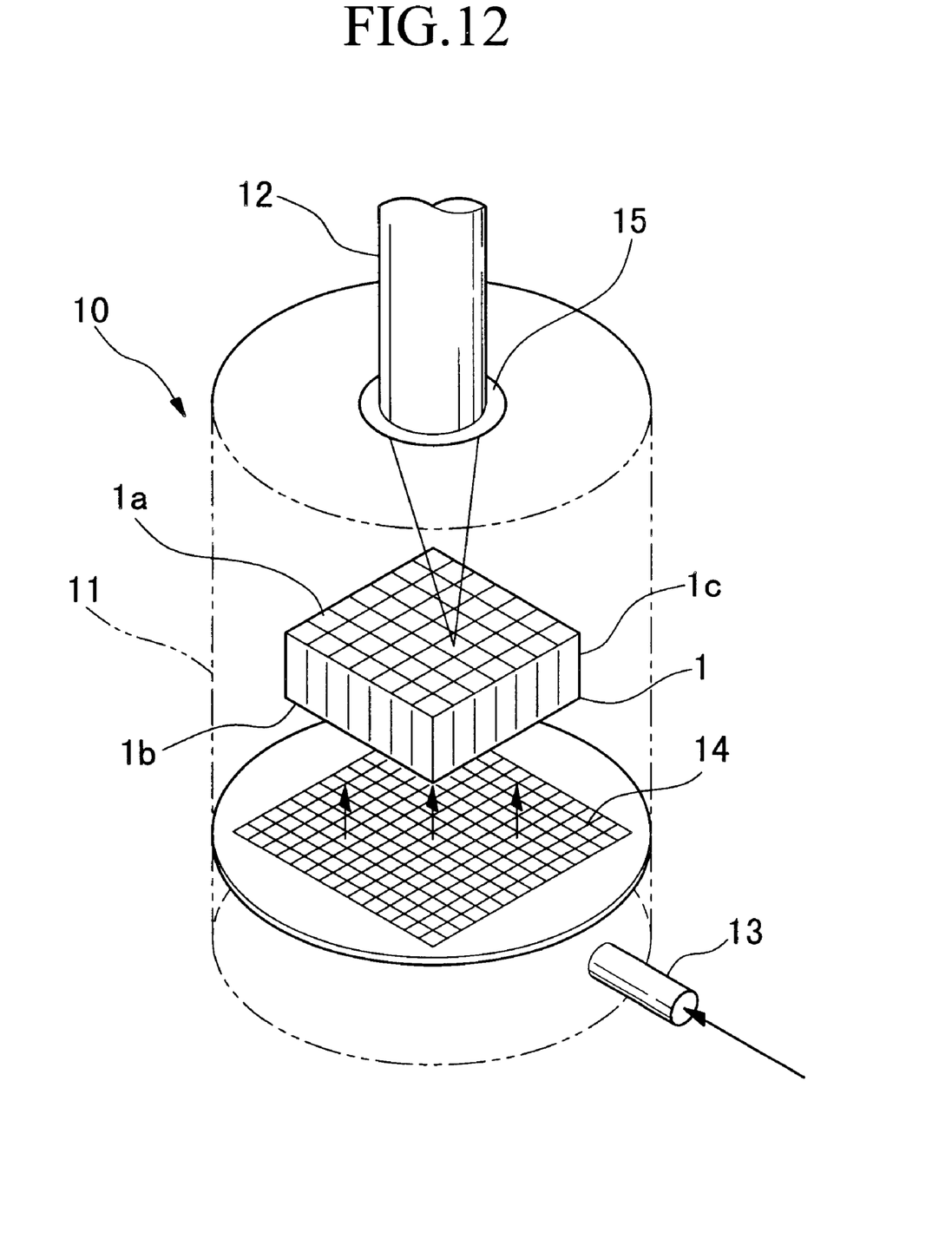
FIG. 12 is a schematic perspective view of a conventional grid support welding apparatus.

When welding the grid support 1 with a laser welding apparatus and the like, fumes are produced so that welding operations are carried out in a hermetically sealed welding chamber 11 of a grid support welding apparatus 10, such as the one shown in FIG. 12, and it is necessary to replace the atmosphere inside the chamber 11 with an inert gas.

In the grid support welding apparatus 10, welding operations on the joint sections P and others on the grid support 1 placed inside the chamber 11 are carried out by using a laser welding device 12 disposed above the grid support 1. Specifically, a grid driving device (not shown) is used to move the grid support 1 inside the chamber 11 to weld successive sections, such as the joint sections P, abutting sections Q and coupling sections R. Also, an inert gas such as Ar and He is supplied to the chamber 11 from the lower section of the grid support 1 in a uniform dispersion by flowing through a feed pipe 13 and a diffuser plate 14 to pass through the grid support 1, and the spent gas is discharged from a discharge port 15.

However, when using the laser welding apparatus 12 to weld the welding sections of the grid support 1, a large quantity of fumes generated during the welding operations and the residual fumes remaining inside the chamber 11 adhere to the glass surfaces, resulting in a problem of fogging the glass surface of the chamber and lowering the transmission efficiency of laser power through the glass. Also, metallic vapors arising from the welding sections during the welding operations result in forming plasma gases, which can interfere with transmission of laser power or strike the glass surface to cause thermal damage to the glass surface.

However, in the grid support welding apparatus 10, although an inert gas is supplied to the interior space of the chamber 11, the inert gas only produces a flow path directing the inert gas from the lower surface 1b to the upper surface 1a of the grid support 1, and it is insufficiently for preventing the fumes from attaching to the glass surfaces or preventing the plasma from causing thermal damage to the glass surfaces. For these reasons, energy utilization efficiency of the laser device was inadequate, and thermal damage on the glass surfaces could not be prevented adequately.

SUMMARY OF THE INVENTION

It is an object of the present invention to provide a grid support welding apparatus to enable to effectively eliminate flying particles produced during the welding operation of a grid support.

The object has been achieved in a grid support welding apparatus comprising: a welding chamber for positioning a grid support for welding; a welding device disposed externally to the welding chamber for welding the grid support contained in the welding chamber; and a slit opening provided inside the welding chamber for jetting an inert gas stream along chamber surfaces of the welding chamber.

When performing welding operations of the grid support housed inside the chamber, fumes and plasmas are produced from the welded sections but they are swept away by the blast of inert gas streaming along the chamber surfaces and are prevented from adhering to the chamber surfaces and eliminated from the chamber. The chamber surfaces are thus kept clean and welding efficiency is maintained.

Also, the chamber surfaces may be positioned opposite to the welding sections of the grid support, because the fumes and plasmas can be effectively swept away by the blast of inert gas streams from the chamber surfaces.

Also, the blast sections may be provided near the intersections of a plurality of chamber surfaces, and inert gas streams may be ejected along the plurality of chamber surfaces in a plurality of directions. This design is highly efficient in preventing the fumes and plasmas from adhering to the chamber surfaces, because one blast section can produce streams in a plurality of directions.

In particular, when the chamber is made in a hexagonal shape, a pair of mutually opposing blast sections may be disposed on top and bottom orthogonal edge sections of two surfaces of the welding chamber respectively opposing an upper grid support surface and a lower grid support surface, each having aligned joint sections. This arrangement allows inert gas streams to flow along the six surfaces, and, especially, allows two inert gas streams to be ejected along the two surfaces opposing the upper and lower surfaces of the grid support that have many welding sections. Therefore, the efficiency of eliminating the fumes and plasmas are further improved.

Also, the blast section may blow out a planar gas stream along a surface of said welding chamber. The planar shape of the stream promotes reliable elimination of the fumes and plasmas.

In these cases, the blast section may be made of an integral section or a plurality of disconnected sections.

DESCRIPTION OF THE PREFERRED EMBODIMENTS

Figure 1:
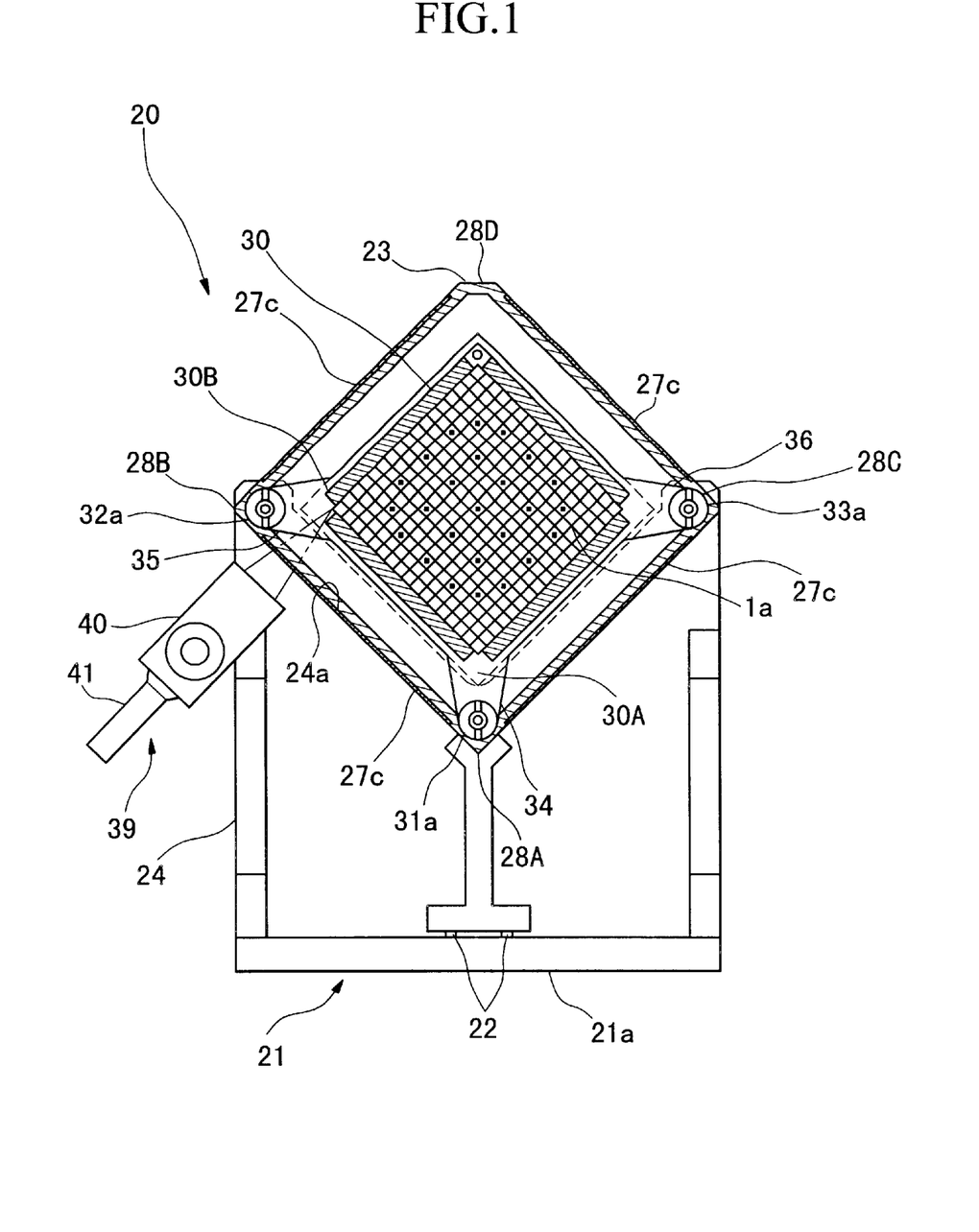
FIG. 1 is a front view of an embodiment of the grid support welding apparatus.
Figure 2:
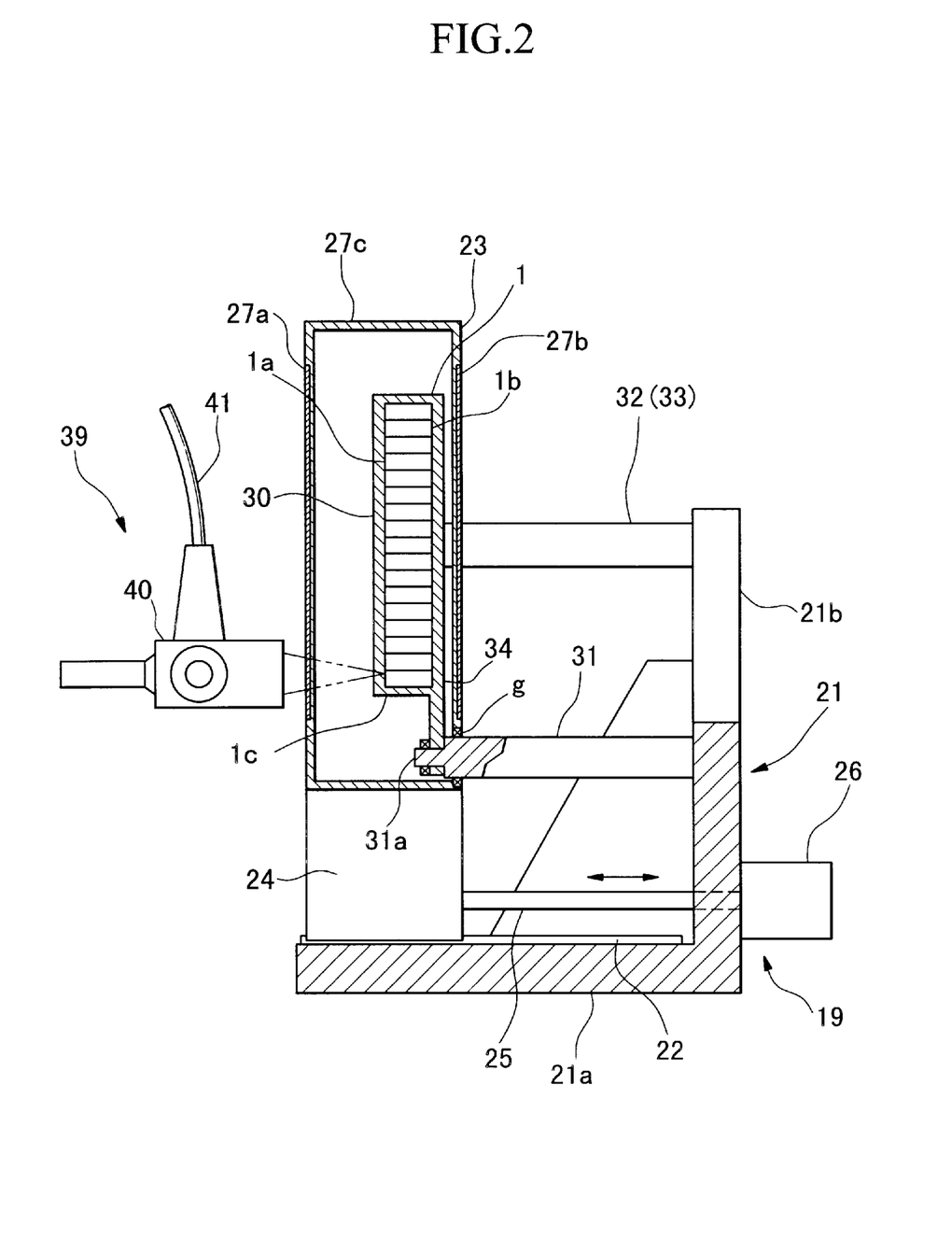
FIG. 2 is a side view of an arrangement of the welding apparatus shown in FIG. 1 to weld joint sections located on the upper surface of the grid support.
Figure 3:
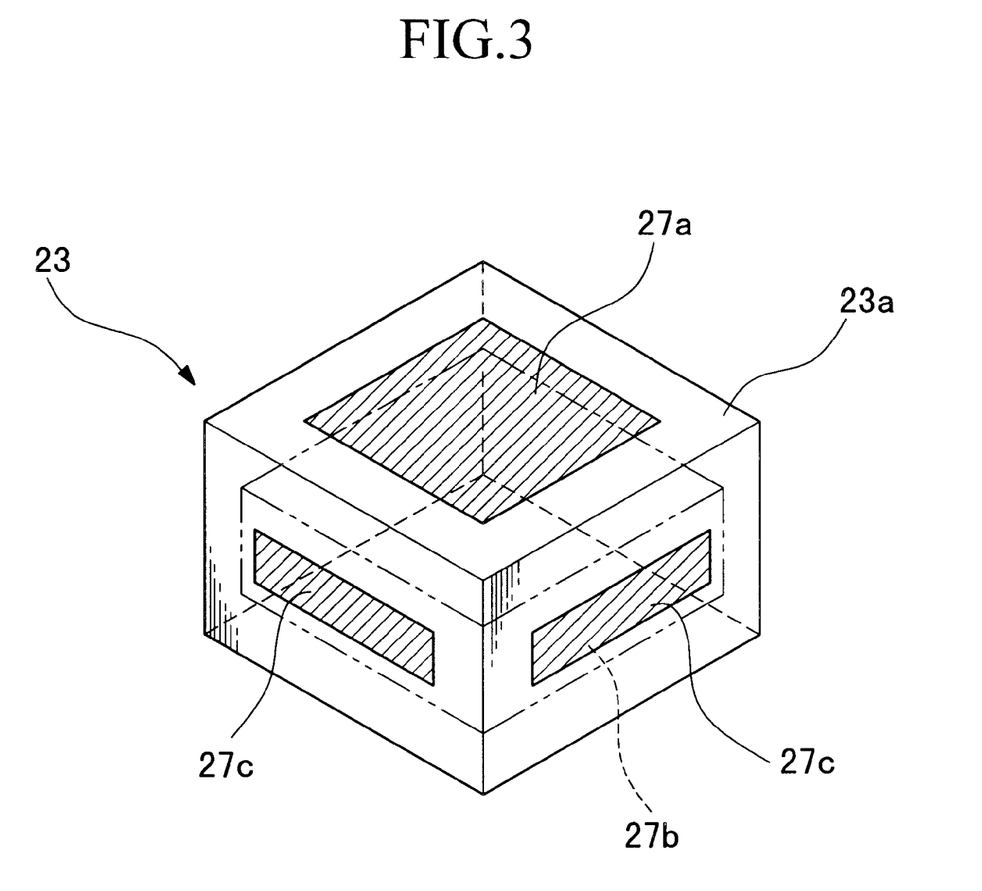
FIG. 3 is a perspective view of the welding chamber used in the grid support welding apparatus of the present invention.
Figure 4:
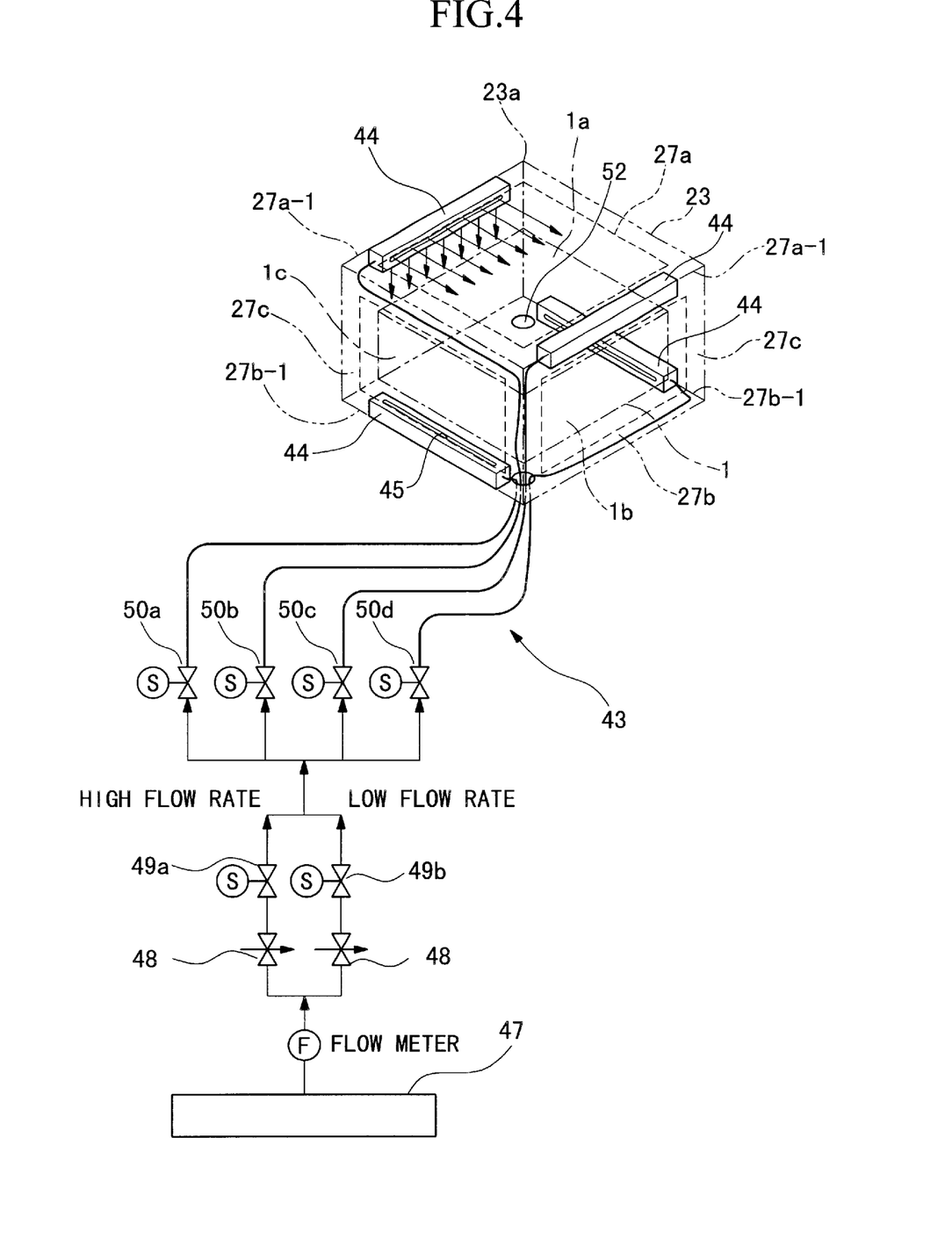
FIG. 4 is a schematic diagram showing the system for flowing an inert gas through the grid support welding apparatus of the present invention.
Figure 5:
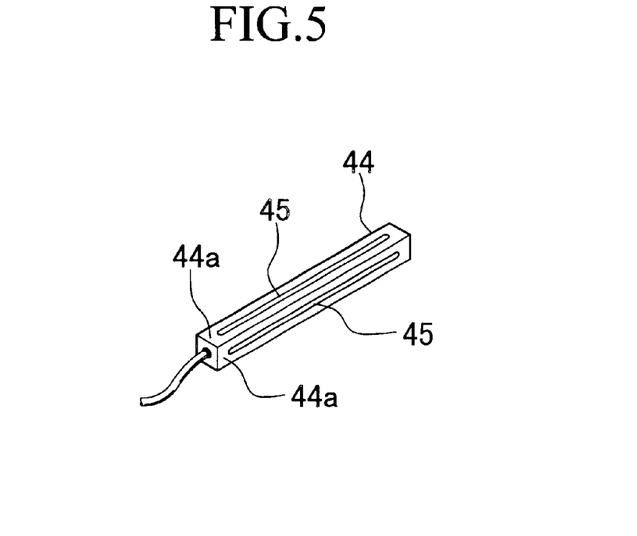
FIG. 5 is a perspective view of a supply nozzle attached to the inside of the welding chamber of the grid support welding apparatus of the present invention.

A first embodiment will be presented with reference to FIGS. 1 to 5, and those parts that are the same as or similar to the conventional apparatus are given the same reference notations in explaining their functions. FIG. 1 shows a front view of a first embodiment of the grid support welding apparatus. FIG. 2 shows a side cross sectional view of the grid support welding apparatus. FIG. 3 shows an external perspective view of the welding chamber. FIG. 4 shows essential parts of the inert gas supply system. FIG. 5 shows a perspective view of a supply nozzle for supplying an inert gas, which is attached to the inside of the welding chamber.

In the grid support welding apparatus 20 shown in FIGS. 1 and 2, a base section 21, having an L-shaped sectional view, is provided with a platform 21a and a lift section 21b, and a pair or parallel guides 22 in a line shape which are provided on top of the platform 21a, and above the rail guides 22, a chamber support 24 for supporting the chamber 23 is disposed so as to be able to freely slide on the rail guides 22.

The chamber support 24 is spirally coupled to one end of a rod shaped guide shaft 25 disposed roughly parallel to the rail guides 22 laid on top of the platform 21a. The guide shaft 25 is provided with a male thread over its entire length, and the other end of the guide shaft 25 is connected to the main shaft of a reversible drive motor 26 attached to the lift section 21b. When the drive motor 26 is operated, the chamber support 24 can be moved forward or back by the rotating guide shaft 25 so as to come close to or away from the lift section 21b. The grid drive device 19 is comprised by the drive motor 26, guide shaft 25 and rail guides 22.

The chamber 23, as shown in FIG. 3, is a six-sided structure and has a square-shaped front surface for housing the grid support 1 inside, for example. The height, width and thickness dimensions of the chamber 23 are chosen such that the chamber 23 is somewhat larger than the grid support 1. Each surface of the chamber 23 is made of a material transmissive to the laser beam such as quartz glass, and the chamber 23 is comprised of roughly square shaped opposing glass surfaces 27a, 27b, four roughly rectangular shaped side glass surfaces 27c, and the frame 23a which is made of metal or the like and supporting these glass surfaces 27a, 27b, 27c; and the chamber 23 is hermetically sealed. The opposing two square surfaces of the grid support 1 are denoted as an upper surface 1b and a lower surface 1b, such that the glass surfaces 27a, 27b of the chamber 23 face the joint sections P formed on the upper and lower surfaces 1a, 1b.

The chamber 23 is supported on a V-shaped depression section 24a of the chamber support 24, in the lowermost edge section 28A formed by the two adjacent inclined side glass surfaces 27c shown in FIG. 1, which is one of the four edge sections 28A, 28B, 28C and 28D formed by the four side surfaces 27c.

The grid support 1 housed in the chamber 23 is supported by a four-sided frame like welding jig 30 engaging with the four side surfaces 1c of the grid support 1. Support jigs 34, 35, 36 of a plate shape extend from the three edge sections 30A, 30B, 30C of the welding jig 30, respectively. On the other hand, three support rods 31, 32, 33 extend from the lift section 21b of the base section 21 parallel to the guide shaft 25, and their free ends 31a, 32a, 33a are inserted into the chamber 23 at the edge sections 28A, 28B, 28C and are detachably connected inside the chamber 23 to the respective chamber support jigs 34, 35, 36.

The arrangement described above results in the grid support 1 inside the chamber 23 being supported by means of the three support rods 31, 32, 33 without being mechanically connected to the chamber 23. The upper and lower surfaces 1a, 1b and the four side surfaces 1c of the grid support 1 are positioned roughly parallel to the glass surfaces 27a, 27b and the side glass surfaces 27c, respectively.

For the purpose of maintaining the chamber 23 to be hermetic, a gasket g may be provided in the insertion section at each of the support rods 31, 32, 33 that supports the glass surface 27b.

On the outside of the chamber 23, there is provided a laser injection head 40, representing a component of a laser device 39, which is connected to a laser emitter (not shown) by means of an optical fiber 41. The laser injection head 40 injects a laser light through the chamber 23 for welding of joint section P and other welding sections of the grid support 1.

Next, the flow paths for supplying an inert gas to the chamber 23 will be explained with reference to FIG. 4.

In the gas flow system shown in FIG. 4, the chamber 23 is shown by the dotted lines, and a supply nozzles 44 is disposed on each of the opposing edge sections 27a-1 of the glass surface 27a (on the inside of the edge of the frame section 23a which are at right angles to the side glass surfaces 27c), along the longitudinal direction of the edge section 27a-1. The supply nozzle 44 is made in a form of a rod of a square-shaped cross section, as shown in FIG. 5, and a slit opening 45, as a blast section, is provided on each of the two adjacent longitudinal surfaces 44a. Inert gas such as Ar or He is ejected from the slit openings 45. Similarly, a supply nozzles 44 is provided on each of the edge sections 27b-1 of the opposing glass surface 27b. The nozzles 44 on the edge sections 27a-1 of one glass surface 27a is at right angles to the nozzles 44 on the edge section 27b-1 of other glass surface 27b.

The result is that, as shown in FIG. 4, the inert gas is blasted from two slit openings 45 of each nozzle 44, in a planar form at mutually orthogonal directions. Also, each planar stream of inert gas flows along the glass surface 27a (27b) and the side surfaces 27c that includes the respective edge sections 27a-1 and 27b-1.

The inert gas supplied from the supply tank 47 passes through two separate passages and the flow rates are controlled by flow valves 48 into a high flow rate and a low flow rate, and the flow rates are adjusted by the respective adjusting valves 49a, 49b. The gas is then sent to electromagnetic valves 50a, 50b, 50c, 50d and is sent further to individual nozzles 44 via passages. The flow switching valves 49a, 49b selects flow rates of the inert gas to be supplied, and the electromagnetic valves 50a start or stop the flow of the gas supplied from the supply nozzles 44. If the inert gas is Ar, the gas is supplied from the supply tank 47 at a pressure of the order to 5~7 kg/cm$^2$.

Control of gas flow through the gas passage 43 to the supply nozzles 44, including start and stop commands, is achieved by a welding program (not shown). Also, a discharge port 52 for discharging the spent inert gas in provided on the interior of the welding chamber 23.

The operation of the grid support welding apparatus 20 having the structure described above will be presented in the following.

The grid support 1 is placed inside the chamber 23 of the grid support welding apparatus 20 on the three support rods 31, 32, 33, and an inert gas is introduced into the chamber 23 through an inert gas passage 43 until the chamber 23 is filled. Then, if a joint section P formed by the crossed inner straps 2 is to be welded, for example, the laser injection head 40 is placed opposite to the upper surface 1a of the grid support 1 at right angles to the joint section P. Also, the grid drive motor 26 is operated, prior to the welding operation, by rotating the guide shaft 25 and moving the chamber support 24 so that, as shown in FIG. 2, the upper surface 1a of the grid support 1 moves away from the glass surface 27 of the chamber 23.

Then, the laser injection head 40 is moved at right angles to the upper surface 1a of the grid support 1 to bring the focal point of the laser injection head 40 on the joint section P, and the laser beam is radiated on the joint section P to spot weld the joint section P. Fumes will be generated by the welding operation and fly towards the glass surface 27a. Also, a high power is used for spot welding so that the metal vapor from the joint section P induces plasma particles, which also fly towards the glass surface 27a.

Inside the c 23, the inert gas is being ejected from each of the slit openings 45 of the supply nozzles 44 along the glass surfaces 27a, 27b, and glass surfaces 27c. In this case, the inert gas streams ejected from a pair of supply nozzles 44 disposed on both edge sections 27a-1 of the glass surface 27a flow along the glass surface 27a and along the glass surfaces 27c, which are at right angles to the glass surface 27a. Therefore, fumes and plasma particles flying towards the glass surface 27a are swept by the inert gas flowing from two opposite directions to flow along the glass surface 27a, and are discharged from the discharge port 52.

Especially, there are many joint sections P to be welded on the upper surface 1a of the grid support 1, and much fumes are generated, and because the laser power is high, large plasma is generated. However, because of the sweeping actions generated from both sides along the glass surface 27a, fumes are swept away effectively and the glass surfaces are protected from the harmful effects of the plasma gas.

Also, fumes and plasma particles remaining in the chamber 23 are also swept by the streams of inert gas along the other side glass surfaces 27c and along the opposing surface 27b by nozzles 44 disposed on both edge sections 27b-1.

Also, when the joint sections P on the lower surface 1b are to be welded, the glass surface 27b of the chamber 23 is moved away from the lower surface 1b, and the coupling section R is laser welded through the side glass surface 27c. Other aspects of the operation and benefits are the same as those described for welding the welding sections on the upper surface 1a.

When welding the abutting section Q for welding the sleeve 4 of the grid support 1, the laser injection head 40 is slanted with respect the direction at right angles to the supper surface 1a of the grid support 1, and the laser beam is directed to the abutting section Q for producing a seam weld. In this case, laser power is not concentrated in one spot so that the generation of plasma and fumes is less severe.

Also, when welding the coupling section R formed by the outer straps 8, the laser injection head 40 is placed in a direction at right angles to the straps 8, and seam welding is performed through the side glass surface 27c. In this case also, laser power is not concentrated in one spot so that fumes and plasma are lesser.

In these cases also, by flowing the inert gas from each of the supply nozzles 44, fumes and plasma are swept away before they have a chance to strike the top and bottom glass surfaces 27a, 27b and side glass surface 27c, and are discharged reliably from the discharge port 52.

As explained above, according to the present invention, fumes and plasma generated during the laser welding operations in the welding chamber 23 are swept away before they have an opportunity to strike the glass surfaces 27a, 27b and 27c by the streams of inert gas directed at right angles to the fumes and plasma along the glass surfaces, 27a, 27b and 27c. The result is that fumes and plasma are prevented from striking on the glass surfaces 27a, 27b and 27c, so that fogging the glass surfaces and the resulting loss of transmission of laser power are prevented as well as thermal damage on the glass surfaces caused by thermal shock from the fumes and plasma.

Next, a second embodiment will be explained with reference to FIGS. 6 to 8. Those parts that are the same as those in the first embodiment are given the same reference notations, and their explanations are omitted. All aspects of the second embodiment are the same as those in the first embodiment, except for the structure of the supply nozzles inside the chamber 23.

Figure 6:
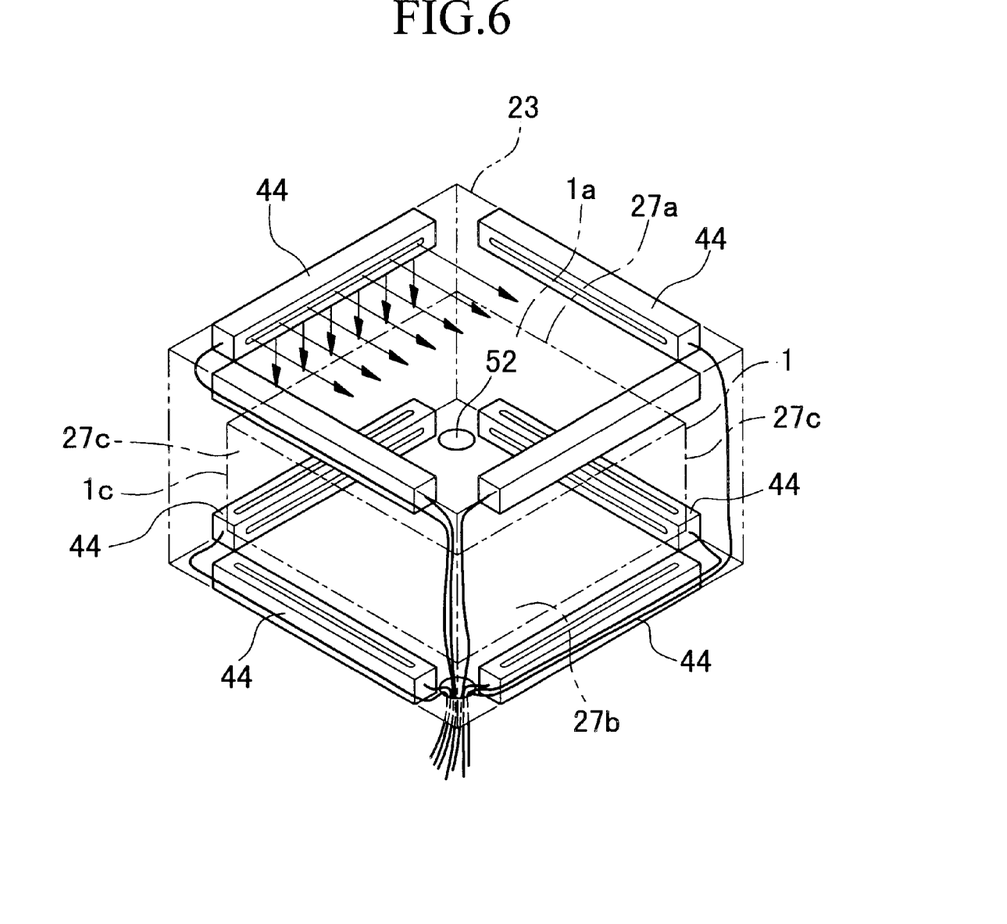
FIG. 6 is a perspective view showing a manner of attaching a supply nozzle to the inside of the welding chamber in a second embodiment.
Figure 7:
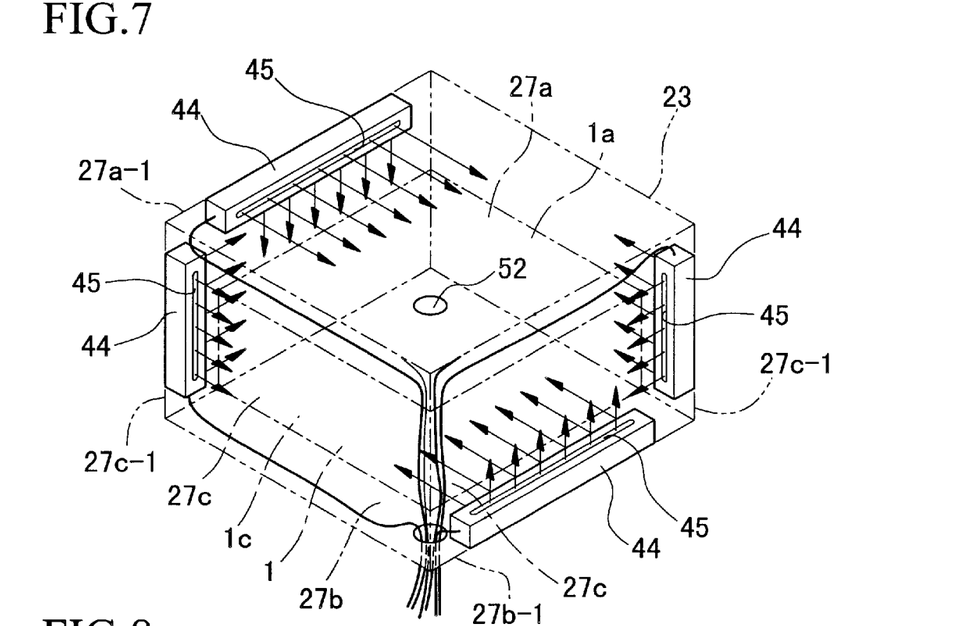
FIG. 7 is a perspective view showing a manner of attaching a supply nozzle to the inside of the welding chamber in a third embodiment.

First, the second embodiment will be presented with reference to FIG. 6 which is a perspective view of an arrangement of the supply nozzles inside the welding chamber.

In this embodiment, the chamber 23 has a supply nozzle 44 disposed on the edge sections 27a-1 and 27b-1, which are arranged on all four perimeters of the pair of glass surfaces 27a, 27b and the four side glass surfaces 27c. Therefore, four supply nozzles 44 are provided on the glass surface 27a that faces the upper surface 1a, and four nozzles 44 are provided on the opposing glass surface 27b that faces the lower surface 1b of the grid support 1.

Each of the supply nozzles 44 ejects inert gas from the two slit openings 45 on its adjacent surfaces along the glass surface 27a or 27b and along the side glass surface 27c in a planar form. The result is that the inert gas streams are produced from the four directions of the edge sections 27a-1, 27b-1 of the glass surfaces 27a, 27b. The result is that, regarding the upper and lower surfaces 1a, 1b where there are many sections to be welded such as joint sections P and abutting section Q, the inert gas is ejected out from the directions of the four edge sections 271-1, 27b-1, and on the side surfaces 1c of the grid support 1, inert gas streams are produced from the direction of two edge sections disposed on top and bottom of the chamber 23.

Because there are eight supply nozzles 44 in the second embodiment, which is twice as many supply nozzles 44 as there are in the first embodiment, the volume of inert gas supplied is twice for each surface. Therefore, fumes and plasmas are removed from the chamber even more reliably.

A third embodiment will be explained with reference to FIG. 7, which is a perspective view of an arrangement of the supply nozzles inside the welding chamber.

In this embodiment, a supply nozzles 44 is provided on each opposing two edge sections 27c-1 in the four sided frame of the side glass surfaces 27c of the chamber 23, and a supply nozzle 44 is further provided on each of the opposing diametric edge sections 27a-1 and 27b-1 of the pair of glass surfaces 27a, 27b. Therefore, this arrangement provides one supply nozzle 44 on the glass surface 27a to face the upper surface 1a of the grid support 1, one supply nozzle 44 on the glass surface 27a to face the lower surface 1b of the grid support 1, and two supply nozzles 44 on the four side glass surfaces 27c to face the side surface 1c of the grid support 1.

Each supply nozzles 44 on the glass surfaces 27a, 27b blows out a curtain of inert gas in mutually orthogonal directions, along each of the glass surfaces 27a, 27c as well as along each of the glass surfaces 27b, 27c. The results is that some glass surfaces are swept in two directions while other glass surfaces are swept only in one direction; more specifically, the gas flows in two directions along a pair of opposite side glass surfaces 27c having supply nozzles 44 on the edge sections 27c-1, 27a-1, and 27c-1, 27b-1 which are disposed on the two perimeters; while the gas flows only in one direction along the other pair of opposing side glass surfaces 27c, and on the top and bottom glass surfaces 27a and 27b.

In the case of this embodiment, because the gas sweeps only in one direction along the glass surfaces that face the upper and lower surfaces 1a, 1b of the grid support 1 that have many sections to be welded such as the joint section P, the apparatus has somewhat inferior particle discharging capability, but this arrangement prevents adhering of fumes and striking of plasma particles on the glass surfaces 27a, 27b and 27c.

A fourth embodiment will be explained with reference to FIGS. 8 and 9.

Figure 8:
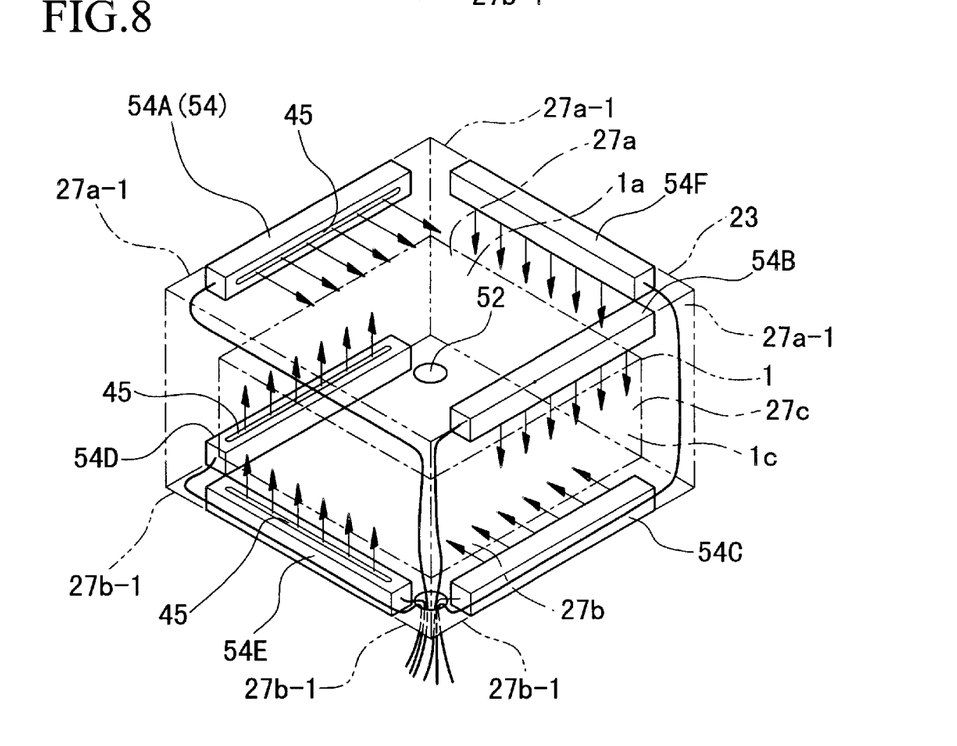
FIG. 8 is a perspective view showing a manner of attaching a supply nozzle to the inside of the welding chamber in a fourth embodiment.

In the chamber 23 shown in FIG. 8, a supply nozzle 54 is provided on each of the edge sections 27a-1 and 27b-1 along the three peripheral edges out of the edge sections along the four peripheral edges of the glass surfaces 27a, 27b that oppose the upper and lower surfaces 1a, 1b of grid support 1. Furthermore, the nozzles 54 are placed in such a way that the resulting gas flow is in one rotational direction about a center axis of the chamber 23. These supply nozzles 54 having only one slit opening are designated as 54A–54F to distinguish them from other supply nozzles having two slit openings on the adjacent surfaces.

Figure 9:
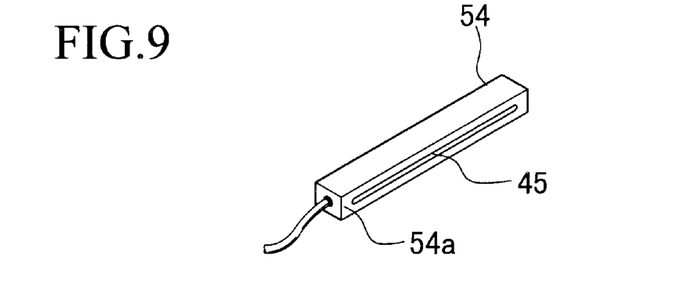
FIG. 9 is a perspective view of the nozzle shown in FIG. 8.

As shown in FIG. 9, the supply nozzle 54A has a shape of a square rod, and a slit opening 45 is formed only on one surface 54a. Therefore, this supply nozzle 54A blows out a curtain of gas in one direction only.

Additionally, as shown in FIG. 8, the supply nozzles 54, comprised by nozzles 54A–54D in the chamber 23, blow out a curtain of gas so as to form a circulation envelope along the four sides, glass surfaces 27a, 27c, 27b and 27c, while the other supply nozzles 54E, 54F blow out the gas in mutually opposite directions. The result is that unidirectional gas flows are generated, respectively along the glass surfaces 27a, 27b and along the side glass surfaces 27c.

It should be noted in the above embodiments that the entire hexagonal body that comprise the welding chamber 23 may be made of glass plates.

Also, in each embodiment presented, the chamber 23 and supply nozzles 44, 54 are produced as separate parts, but they may be integrated into a unit member. In either case, slit opening(s) are provided in each nozzle. Also, in the above embodiments, supply nozzles 44, 54 are made as single piece in a rod shape, but the same effect can be produced by arranging a plurality of separate nozzles to produce a gas curtain made up of many inert gas jets.

What is claimed is:

1. A grid support welding apparatus comprising:
   a welding chamber for positioning a grid support for welding, said welding chamber having a plurality of chamber surfaces;
   a welding device disposed externally to said welding chamber for welding said grid support contained in said welding chamber; and
   at least one opening provided inside said welding chamber for jetting a stream of an inert gas along said plurality of chamber surfaces of said welding chamber, said at least one opening extending longitudinally along an edge section adjoining two chamber surfaces of said chamber surfaces.

2. A grid support welding apparatus according to claim 1, wherein said chamber surfaces are disposed so as to oppose welding sections of said grid support.

3. A grid support welding apparatus according to claim 1, wherein said at least one opening comprises a plurality of openings each positioned in a respective edge section adjoining two chamber surfaces of said plurality of chamber surfaces such that the inert gas is blown out to stream over said plurality of chamber surfaces in a plurality of directions.

4. A grid support welding apparatus according to claim 2, wherein said at least one opening comprises a plurality of openings each positioned in a respective edge section adjoining two chamber surfaces of said plurality of chamber surfaces such that the inert gas is blown out to stream over said plurality of chamber surfaces in a plurality of directions.

5. A grid support welding apparatus according to claim 4, wherein said welding chamber is constructed in a shape of a hexagonal container, and a pair of mutually opposing blast sections are disposed on top and bottom orthogonal edge sections of two surfaces of said welding chamber respectively opposing an upper grid support surface and a lower grid support surface, each having aligned joint sections.

6. A grid support welding apparatus comprising:
   a welding chamber having a plurality of chamber surfaces and configured to position a grid support for welding;
   a welding device configured to weld said grid support contained in said welding chamber; and
   a plurality of openings configured to jet a stream of an inert gas inside said welding chamber transversely along said plurality of chamber surfaces, said plurality of openings each extending longitudinally along a respective one of a plurality of edge sections each adjoining two chamber surfaces of said plurality of chamber surfaces.

7. A grid support welding apparatus according to claim 6, wherein said plurality of chamber surfaces are disposed so as to oppose welding sections of said grid support.

8. A grid support welding apparatus according to claim 6, wherein said plurality of openings is provided such that the inert gas is blown out to stream over said plurality of chamber surfaces in a plurality of directions.

9. A grid support welding apparatus according to claim 7, wherein said plurality of openings is provided such that the inert gas is blown out to stream over said plurality of chamber surfaces in a plurality of directions.

10. A grid support welding apparatus according to claim 9, wherein said welding chamber comprises a hexagonal container, and a pair of mutually opposing blast sections are disposed on top and bottom orthogonal edge sections of two surfaces of said welding chamber respectively opposing an upper grid support surface and a lower grid support surface, each having aligned joint sections.

11. A grid support welding apparatus comprising:

a welding chamber having a plurality of chamber surfaces and configured to position a grid support for welding;

a welding device configured to weld said grid support contained in said welding chamber; and jetting means for jetting at least one stream of an inert gas inside said welding chamber transversely along said plurality of chamber surfaces.

* * * * *